United States Patent

Vallejo

[11] Patent Number: 5,914,146
[45] Date of Patent: Jun. 22, 1999

[54] METHOD OF PREPARING A SALSA PRODUCT

[76] Inventor: Bonnie Kay Vallejo, 4247 Amelia Ave. #1A, Lyons, Ill. 60534

[21] Appl. No.: 08/963,611

[22] Filed: Oct. 31, 1997

[51] Int. Cl.$^6$ ........................................................ A23L 1/221
[52] U.S. Cl. ........................ 426/506; 426/534; 426/589; 426/615; 426/638; 426/650; 426/651; 426/509
[58] Field of Search ........................ 426/534, 589, 426/615, 638, 650, 651, 484, 506, 509, 518

[56] References Cited

U.S. PATENT DOCUMENTS

| | | | |
|---|---|---|---|
| D. 339,744 | 9/1993 | Seppala | D9/425 |
| D. 343,494 | 1/1994 | Thorniley | D1/106 |
| 4,393,090 | 7/1983 | Coroneos | 426/646 |
| 4,396,817 | 8/1983 | Eck et al. | 219/10.55 |
| 4,597,974 | 7/1986 | Fonteneau et al. | 426/129 |
| 4,693,900 | 9/1987 | Molinari | 426/128 |
| 4,935,259 | 6/1990 | Vella | 426/589 |
| 5,106,643 | 4/1992 | Laufer | 426/5.65 |
| 5,258,198 | 11/1993 | Bastian et al. | 426/615 |
| 5,260,083 | 11/1993 | Brain et al. | 426/573 |
| 5,356,648 | 10/1994 | Kortschot | 426/249 |
| 5,676,991 | 10/1997 | Dull | 426/534 X |
| 5,714,192 | 2/1998 | Dull et al. | 426/534 |

OTHER PUBLICATIONS

The Encyclopedia Of Herbs, Spices and Flavorings, Dorling Kindersley, Inc. N.Y., p. 245, 1992.
Latin American Cooking, Time–Life Books, N.Y., pp. 84, 105, 1968.

*Primary Examiner*—Milton Cano
*Attorney, Agent, or Firm*—Goldstein & Canino

[57] ABSTRACT

A salsa formulation comprising a tomato component, a whole pepper component, a whole spice component, and a powdered spice component. The whole pepper component comprises raw banana peppers, serrano peppers, and jalapeno peppers which are boiled until soft and light green in color to release spicy oils contained in the pepper seeds that are not normally released when said peppers are ingested raw. The boiled peppers are de-stemmed are mixed with the tomato component, whole spice component, and powdered spice component, and then blended at high speed until a paste consistency is reached.

2 Claims, 1 Drawing Sheet

METHOD OF PREPARING A SALSA PRODUCT

BACKGROUND OF THE INVENTION

The invention relates to a salsa formulation. More particularly the invention relates to a salsa formulation having a unique flavor which results from both a unique combination of ingredients, and a unique method of manufacture.

Salsa is a food that started as an ethnic specialty, but has entered the mainstream in recent years. Salsa is commonly enjoyed in a variety of foods wherein it is mixed with sour cream, guacamole, ground beef, nacho chips, and more. Salsa has a tomato base, and incorporates a variety of diced vegetables, all mixed together and then spiced in varying levels from mild to hot. However, the overall texture of salsa derives from the tomato base, typically a mixture of tomato paste and chunks.

True salsa "aficionados" want their salsa to be as hot as possible. Typically the level of "spiciness", or "hotness" derives from the pepper content, coming from both whole raw peppers and powdered pepper. There is a limit to the level of hotness that can be obtained from the raw peppers themselves, while maintaining the desired tomato texture domination. Thus many seek to increase the level of spiciness by adding powdered pepper. Often however, adding too much powdered pepper gives the salsa a granular or gritty texture which is undesirable.

While these units may be suitable for the particular purpose employed, or for general use, they would not be as suitable for the purposes of the present invention as disclosed hereafter.

SUMMARY OF THE INVENTION

It is an object of the invention to produce a salsa having a taste that is richer and spicier than previous salsa formulations.

It is another object of the invention to provide a salsa which increases the level or spiciness, while maintaining the traditional tomato based texture expected from a salsa.

It is a further object of the invention to provide a salsa which maximizes spiciness without the use of excessive powdered pepper. Various raw peppers are pre-boiled to release spice oils that are contained in the seeds of the raw peppers, which would not normally be released if the peppers are consumed raw, as in a typical, prior-art salsa mixture.

The invention is a salsa formulation comprising a tomato component, a whole pepper component, a whole spice component, and a powdered spice component. The whole pepper component comprises raw banana peppers, serrano peppers, and jalapeno peppers which are boiled until soft and light green in color to release spicy oils contained in the pepper seeds that are not normally released when said peppers are ingested raw. The boiled peppers are de-stemmed are mixed with the tomato component, whole spice component, and powdered spice component, and then blended at high speed until a paste consistency is reached.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
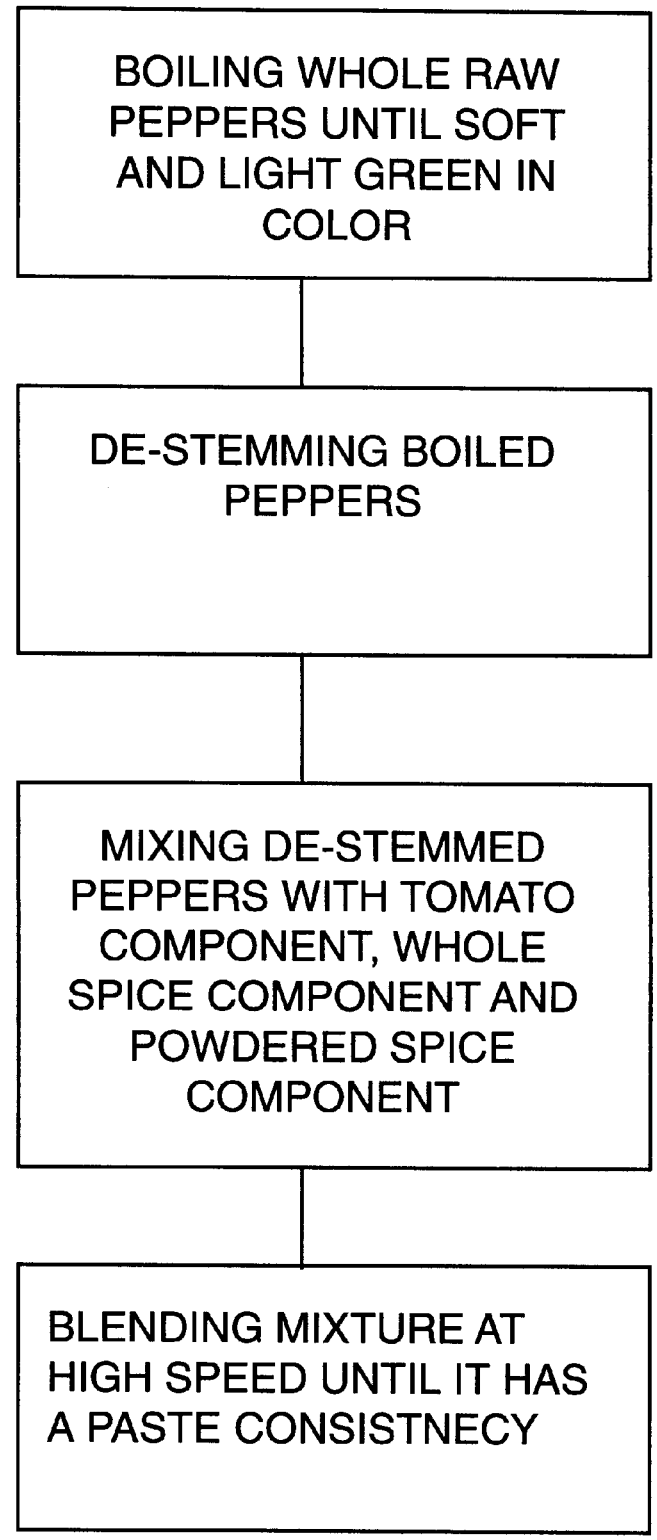
FIG. 1 is a flow diagram, illustrating the major steps of salsa formulation according to the present invention.

Salsa formulation according to the present invention begins by assembly of the major ingredients. In simplistic terms, the salsa comprises a whole pepper component, a tomato component, a powdered spice component, and a whole spice component. Each of these components may be further defined in terms of its individual elements and subelements.

Quantities and proportions recited hereinafter are approximate, and reflect a household formulation of the salsa of the present invention. Proportions for a large scale commercial formulation would clearly be defined in different terms, but such proportions and quantities can be easily derived therefrom.

The tomato component is of key importance to maintaining traditional salsa texture. The tomato must dominate, forming a base for the other ingredients. A standard fourteen to sixteen ounce can of whole tomatoes is most suitable.

The whole pepper component includes a combination of various raw peppers. The preferred combination includes 15 serrano peppers, 15 jalepeno peppers, and 5 banana peppers. A critical step taken is to pre-boil the peppers. The peppers are boiled until light green in color and very soft. The pre-boiling step activates and releases spicy oils normally contained in the seeds, but not released when typical salsa is ingested.

The whole spice component includes garlic, onion, and cilantro. Typically, 1 small onion, two cloves of garlic, and ½ cup of cilantro are employed for the present formulation.

The powdered seasoning component employs salt, and commercial seasonings sold by GOYA under the tradenames ADOBO and SAZON. ADOBO seasoning contains salt, granulated garlic, tricalcium phosphate, oregano, black pepper, and turmeric. SAZON seasoning contains monosodium glutonate, salt, garlic powder, onion powder, spice extract, and tricalcium phosphate. Clearly there is some duplication in content between the seasonings. However, the proportions contained in these commercial products are effective in flavoring the salsa. Large scale production of the salsa would involve analysis of the various components of these seasonings, and isolation of the key ingredient proportions. In addition in large scale production, the tricalcium phosphate may be eliminated because it functions mainly as an anti-caking agent, which is unnecessary when the active ingredients are directly added into the salsa formulation. It should be noted that a small quantity of black pepper is contained within the ADOBO seasoning. However, no additional black pepper is added, because the desired spiciness is obtained by the pre-boiling of the whole peppers.

As illustrated in FIG. 1, following the pre-boiling of the raw whole peppers, the stems are removed from the whole peppers to produce stemless peppers. The stemless peppers are mixed with the whole spice component, the powdered spice component, and the tomato component. This mixture is blended at high speed in a typical commercial blender until all large pieces are broken down, and the mixture reaches a paste consistency.

In conclusion, herein is presented a salsa formulation which has a unique taste. The unique taste is due in part to a unique combination of ingredients previously not used in a salsa, but also due to the step of pre-boiling raw peppers to release spicy oils contained in seeds of the raw peppers.

What is claimed is:

1. A salsa formulation, comprising:

a tomato component;

a whole pepper component made from whole peppers, the whole pepper component comprises banana peppers, serrano peppers, and jalapeno peppers which are pre-boiled and light green in color;

a whole spice component comprising garlic cloves, whole onions and cilantro; and a powdered spice component.

2. A salsa formulation method, using whole peppers comprising banana peppers, serrano peppers, and jalapeno peppers and a tomato component, comprising:

boiling the whole peppers until soft and light green in color;

removing stems from the whole peppers;

mixing the tomato component and the destemmed whole peppers with a whole spice component comprising cloves of garlic, whole onions and cilantro; and blending the mixture at a high speed until said mixture has a paste consistency.

* * * * *